United States Patent
Wu et al.

(10) Patent No.: US 11,989,077 B2
(45) Date of Patent: May 21, 2024

(54) MAXIMUM CURRENT SUPPRESSION FOR POWER MANAGEMENT IN A MULTI-CORE SYSTEM

(71) Applicant: MediaTek Inc., Hsinchu (TW)

(72) Inventors: Hung-Wei Wu, Hsinchu (TW); Chih-Yu Chang, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 26 days.

(21) Appl. No.: 17/866,483

(22) Filed: Jul. 16, 2022

(65) Prior Publication Data

US 2023/0176645 A1   Jun. 8, 2023

Related U.S. Application Data

(60) Provisional application No. 63/286,124, filed on Dec. 6, 2021.

(51) Int. Cl.
   *G06F 1/32*      (2019.01)
   *G06F 1/3206*    (2019.01)
   *G06F 1/3296*    (2019.01)
   *G06F 1/3203*    (2019.01)

(52) U.S. Cl.
   CPC .......... *G06F 1/3296* (2013.01); *G06F 1/3206* (2013.01); *G06F 1/3203* (2013.01)

(58) Field of Classification Search
   CPC ............................ G06F 1/3296; G06F 1/3206
   USPC ........................................................ 713/320
   See application file for complete search history.

(56) References Cited

U.S. PATENT DOCUMENTS

| | | | | |
|---|---|---|---|---|
| 6,564,328 | B1* | 5/2003 | Grochowski | G06F 9/3836 713/320 |
| 9,075,614 | B2* | 7/2015 | Fetzer | G06F 1/324 |
| 11,409,560 | B2* | 8/2022 | Jambur Sathyanarayana | G06F 9/4401 |
| 2007/0249305 | A1* | 10/2007 | Hsu | H04W 52/0287 455/127.5 |
| 2012/0053897 | A1* | 3/2012 | Naffziger | G06F 1/3206 702/182 |
| 2013/0024713 | A1* | 1/2013 | Bajic | G06F 1/324 713/340 |
| 2016/0098070 | A1* | 4/2016 | Curran | G06F 1/28 713/300 |
| 2019/0146567 | A1* | 5/2019 | Kosonocky | G06F 1/3287 713/322 |
| 2019/0146569 | A1* | 5/2019 | Nge | G06F 1/305 713/320 |

(Continued)

OTHER PUBLICATIONS

Extended European Search Report, App. No. EP 22 21 1364, dated Apr. 13, 2023.

*Primary Examiner* — Volvick Derose
(74) *Attorney, Agent, or Firm* — Tong J. Lee

(57) ABSTRACT

A management circuit is coupled to multiple processor cores for performing current suppression. The management circuit includes a detection circuit and a throttle signal generator. The detection circuit is operative to receive an activity signal from each processor core, and estimate a total current consumed by the plurality of processor cores based on activity signals. The activity signal indicates a current index proportional to current consumption of the processor core in a given time period. The throttle signal generator is operative to assert or de-assert throttle signals to the processor cores, one processor core at a time, based on one or more metrics calculated from the total current.

20 Claims, 6 Drawing Sheets

(56) References Cited

U.S. PATENT DOCUMENTS

| | | | | |
|---|---|---|---|---|
| 2021/0096635 A1* | 4/2021 | Kalyanam | ............. | G06F 1/3237 |
| 2021/0208659 A1* | 7/2021 | Gendler | ................ | G06F 1/3296 |
| 2021/0334187 A1* | 10/2021 | Sewani | ................... | G06F 21/81 |
| 2023/0062546 A1* | 3/2023 | Vanderpool | ........... | G06F 1/3296 |
| 2023/0068471 A1* | 3/2023 | Vanderpool | ........... | G06F 1/3243 |
| 2023/0238800 A1* | 7/2023 | Musunuri | ............ | G06F 1/3206 |
| | | | | 700/295 |

* cited by examiner

US 11,989,077 B2

MAXIMUM CURRENT SUPPRESSION FOR POWER MANAGEMENT IN A MULTI-CORE SYSTEM

CROSS-REFERENCE TO RELATED APPLICATIONS

This application claims the benefit of U.S. Provisional Application No. 63/286,124 filed on Dec. 6, 2021, the entirety of which is incorporated by reference herein.

TECHNICAL FIELD

Embodiments of the invention relate to power management; more specifically, to current suppression in a multi-core system.

BACKGROUND

FIG. 1 illustrates a block diagram of a printed circuit board (PCB) system that includes a power source 110 coupled to an integrated circuit (IC) load 120. The power source 110 provides power to the IC load 120 through PCB board traces 130 and components 140 such as inductance (L) and capacitance (C). The IC load 120 includes power-consuming electronics such as processor cores. The processor cores can generate current overloading that exceeds the maximum current limitation and cause damage to the PCB components and traces. As shown in the dashed block above the PCB system, the processor cores can also generate an inrush current in a short time that induces a voltage droop and causes system failure.

A traditional method for suppressing current is using multiple capacitances and inductances. However, adding these components to the PCB board increases the total hardware size, thermal consumption, and cost. Another method is using software commands to decrease the power supply and operating frequency. However, software commands usually incur long latency and cannot suppress a current surge in time.

Thus, there is a need for the improvement of power management in a processing system to ensure safe operations.

SUMMARY

In one embodiment, a management circuit coupled to multiple processor cores is provided for performing current suppression. The management circuit includes a detection circuit and a throttle signal generator. The detection circuit is operative to receive an activity signal from each processor core, and estimate a total current consumed by the plurality of processor cores based on activity signals. The activity signal indicates a current index proportional to current consumption of the processor core in a given time period. The throttle signal generator is operative to assert or de-assert throttle signals to the processor cores, one processor core at a time, based on one or more metrics calculated from the total current.

In another embodiment, a method is provided for performing current suppression. The method comoprises the steps of receiving an activity signal from each of a plurality of processor cores, and estimating a total current consumed by the plurality of processor cores based on activity signals. The activity signal indicates a current index proportional to current consumption of the processor core in a given time period. The method further comprises the step of asserting or de-asserting throttle signals to the plurality of processor cores, one processor core at a time, based on one or more metrics calculated from the total current.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a mechanism for maximum current suppression (MCS) in a multi-core system to suppress peak current and/or inrush current for power integrity on a PCB board. The MCS can suppress the peak current to protect PCB board traces and components from physical damage. The MCS can also suppress the inrush current slew rate to prevent voltage droop and system failure. In one embodiment, the MCS receives an activity signal from each processor core in the multi-core system and asserts or de-asserts a throttle signal accordingly. Based on the per-core activity signal, the MCS can detect a trigger event and use the throttle signal to reduce the activities of the cores.

In the system described herein, a "processor core" may be a central processing unit (CPU), a digital signal processor (DSP), a multimedia processor, a graphics processing unit (GPU), an artificial intelligence (AI) processor, a vector processor, or another general purpose or special purpose processing circuitry. In some systems, a processor may be the same as a "core" or a "processor core", while in some other systems a processor may include multiple cores. A multi-processor system may also be known as a multi-core system. In the system described herein, the term "core" is used interchangeably with the terms "processor" and "processor core."

Figure 1:
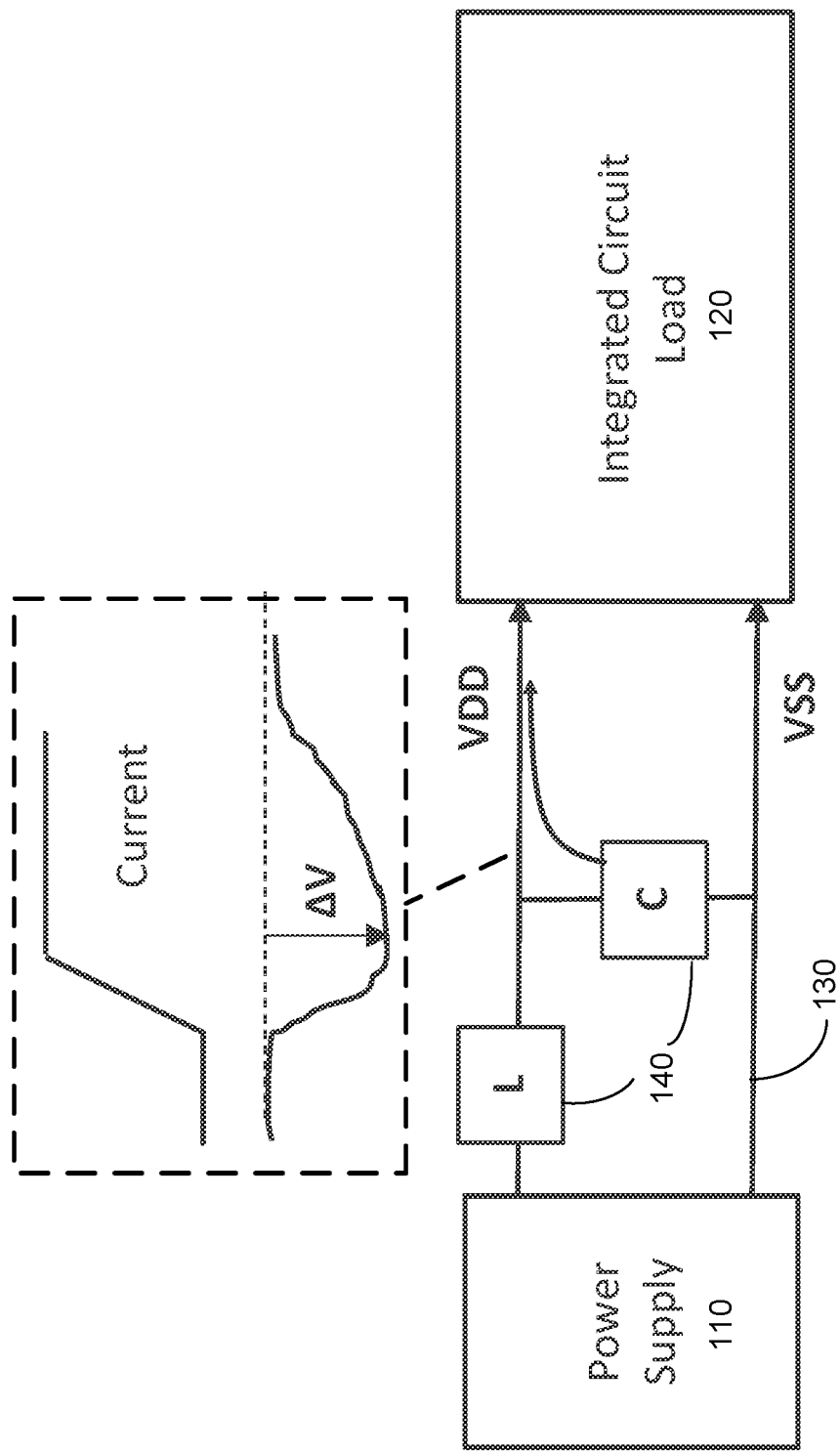
FIG. 1 is a block diagram of a printed circuit board (PCB) system in the related art.
Figure 2:
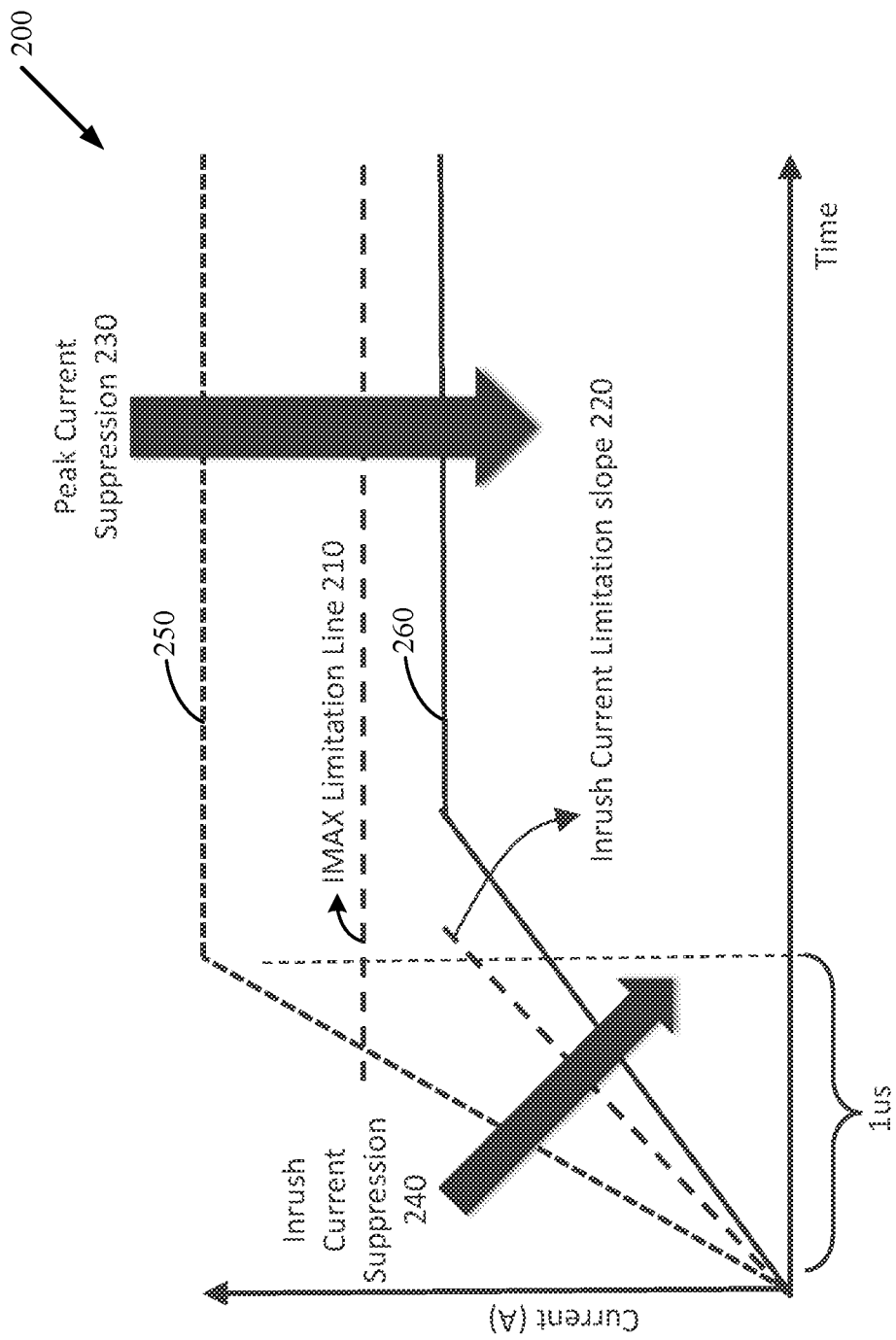
FIG. 2 is a diagram illustrating peak current suppression and inrush current suppression according to one embodiment.

FIG. 2 is a diagram 200 illustrating peak current suppression and inrush current suppression according to one embodiment. Diagram 200 shows a maximum current (IMAX) limitation line 210, which is the upper bound for the peak current. Diagram 200 also shows an inrush current limitation line 220, which is the upper bound for the change in current per time unit. The dotted line 250 is the current vs. time curve without the MCS, and the solid line 260 is the current vs. time curve with the MCS. The effect of the MCS on peak current suppression is indicated by the first arrow 230, and on inrush current suppression is indicated by the second arrow 240. Thus, the MCS can suppress the peak current to protect a PCB system from physical damage. The MCS can also suppress the inrush current slew rate to protect a PCB system from voltage droop and system failure.

Figure 3:
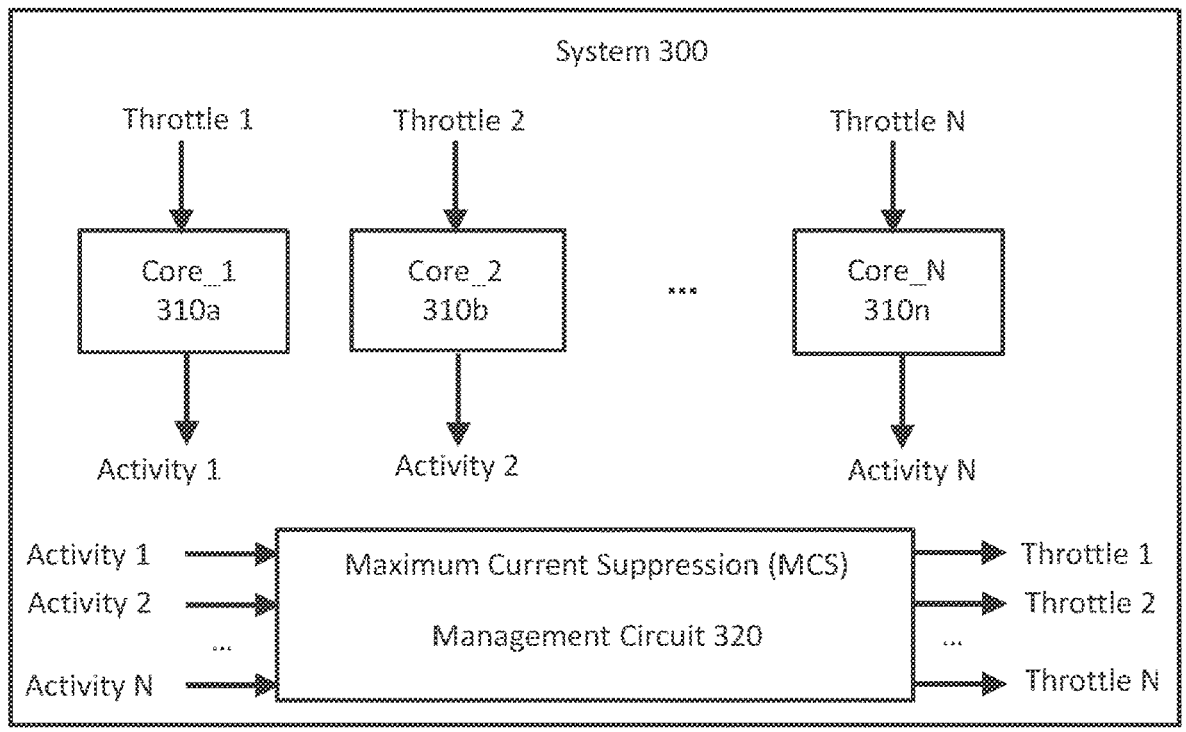
FIG. 3 is a block diagram illustrating a system including a maximum current suppression (MCS) management circuit according to one embodiment.

FIG. 3 is a block diagram illustrating a system 300 including an MCS management circuit 320 according to one embodiment. The system 300 includes processor cores (e.g., core_1 310a, core_2 310b, ..., core_N 310n), collectively referred to as processor cores 310, where index n can be any integer greater than one. The processor cores 310 may have the same processor type and/or different processor types. The processor cores 310 may share the same instruction set architecture (ISA) and/or different ISAs.

In one embodiment, the system 300 can be integrated on a single integrated circuit die, or on separate dies in a multiple-circuit package. In one embodiment, the system 300 may be integrated as a system-on-a-chip (SOC). It is understood the embodiment of FIG. 3 is simplified for illustration purposes. Additional hardware components may be included.

Although not shown in FIG. 3, the system 300 further includes a memory. The memory may include on-chip and off-chip memory devices such as dynamic random access memory (DRAM), static RAM (SRAM), flash memory, and other volatile or non-volatile memory devices. The system 300 may also include a dynamic voltage frequency scaling (DVFS) controller to control the operating point (e.g., frequency and voltage) of the active computing circuits in the system 300.

In one embodiment, the MCS management circuit 320 (also referred to as the management circuit 320) receives an activity signal and sends a throttle signal to each processor core 310. The activity signal indicates a current index estimated by each processor core 310, where the current index is proportional to the current consumption of the processor core 310 in a given time period. In one embodiment, each operation code (OPCODE) of the processor core 310 is assigned a predetermined unit of activity. For example, the MOV operation can generate 11 units of activity, and the MUL operation can generate 55 units of activity. The number of units of activity is proportional to the current consumption by the OPCODE, for example, 100 units of activity may correspond to 200 milliamperes (mA) in current consumption, and 200 units of activity may correspond to 400 mA in current consumption. Each processor core 310 sums up the total units of activity in a given time period to generate a current index. The given time period may be a configurable time period. The OPCODEs that generate the total units of activity in a given time period may be the OPCODEs that are in the decode stage, in the execution stage, or have been recently executed by the corresponding processor core 310.

The management circuit 320 receives an activity signal from each processor core 310 and calculates a total current and moving averages of the total current. Based on the total current and the moving averages, the management circuit 320 can detect both peak current and inrush current and assert or de-assert a throttle signal to each processor core. When the throttle signal to a processor core is asserted, the processor core can throttle its processing pipeline to reduce the activity and current consumption.

Figure 4:
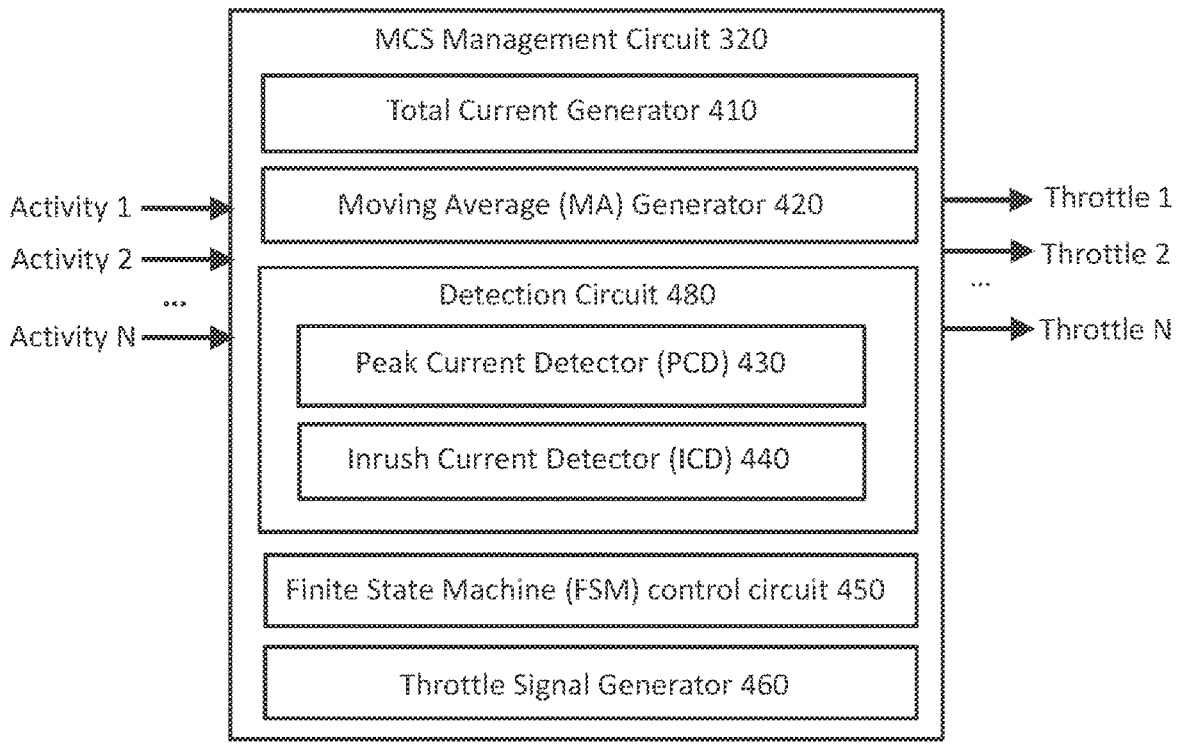
FIG. 4 is a block diagram illustrating an MCS management circuit according to one embodiment.

FIG. 4 is a block diagram illustrating the MCS management circuit 320 ("management circuit 320") according to one embodiment. The management circuit 320 includes a total current generator 410, a moving average (MA) generator 420, a current detector 480, a finite state machine (FSM) 450, and a throttle signal generator 460. In one embodiment, the current detector 480 includes a peak current detector (PCD) 430 for detecting the peak current generated or caused to be generated by the processor cores. In one embodiment, the current detector 480 includes an inrush current detector (ICD) 440 for detecting the inrush current generated or caused to be generated by the processor cores. Although both PCD 430 and ICD 440 are shown in FIG. 4, in some embodiments the current detector 480 may include either PCD 430 or ICD 440, while in some other embodiments the current detector 480 may include both PCD 430 and ICD 440.

The total current generator 410 uses scaling and summation to calculate a total current value, where the total current=Summation of (Activity[n]×Weight)+Leakage_current, n is a running index identifying processor core 1, ..., N. In an embodiment where an 8-bit bus is used to carry each activity signal, Activity[n] is an 8-bit value and is the current index mentioned above in connection with FIG. 3. The number of bits may be different according to precision and cost considerations.

In one embodiment, Weight=current scaling×DVFS scaling. In one embodiment, current scaling=IMAX.Dyn(mA)/[8'hFF], where IMAX.Dyn(mA) is the maximum average dynamic current in milliampere (mA). For example, if IMAX.Dyn(mA)=4000 mA and Activity[n] is 8-bit, current scaling=4000/255=15.7. In an alternative embodiment, the current scaling may be obtained by a linear regression method for improved precision.

In one embodiment, DVFS scaling=(Vcur×Fcur)/(Vmax×Fmax). For example, when Vcur=0.7 volts, Fcur=0.9 GHz, Vmax=0.75 volts, Fmax=1 GHz, DVFS scaling=0.84. Thus, in this example, Weight=current scaling×DVFS scaling=15.7×0.84=13.2.

The moving average (MA) generator 420 generates moving averages of the total current. As an example, the moving averages may include 8 MA, 32 MA, 64 MA, and the like. For example, 8 MA=Average(TA[T], TA[T-1], ... TA[T-7]), and 32 MA=Average(8 MA[T], 8 MA[T-8], 8 MA[T-16], 8 MA[T-24]), where T is a timing cycle. Additional moving averages 64 MA, 128 MA, 256 MA, 512 MA, 1024 MA, etc. can be generated in the same way as 32 MA.

In one embodiment, the peak current detector (PCD) 430 uses a short-term moving average (e.g. 32 MA or another moving average) to detect the peak current. For each core, the PCD 430 compares the detected peak current with a high threshold (TH1h) to detect a PCD_Trigger event, and with a low threshold (TH1l) to detect a PCD_Release event. For example, the condition for the PCD_Trigger event is met when 32 MA>TH1h, and the condition for the PCD_Release event is met when 32 MA<TH1l, where TH1h and TH1l are programmable thresholds.

In one embodiment, the inrush current detection (ICD) 440 computes the difference between a short-term moving average and a long-term moving average, and uses the difference to detect the inrush current. For each core, the ICD 440 compares the difference with a high threshold (TH2h) to detect an ICD_Trigger event, and with a low threshold (TH2l) to detect an ICD_Release event. For example, the difference may be computed as 32 MA-1024 MA. In one embodiment, the condition for the ICD_Trigger event is met when (32 MA-1024 MA)>TH2h, and the condition for the ICD_Release event is met when (32 MA-1024 MA)<TH2l, where TH2h and TH2l are programmable thresholds. It is noted that TH1h and TH2h may be different from each other, and TH1l and TH2l may be different from each other.

Figure 5:
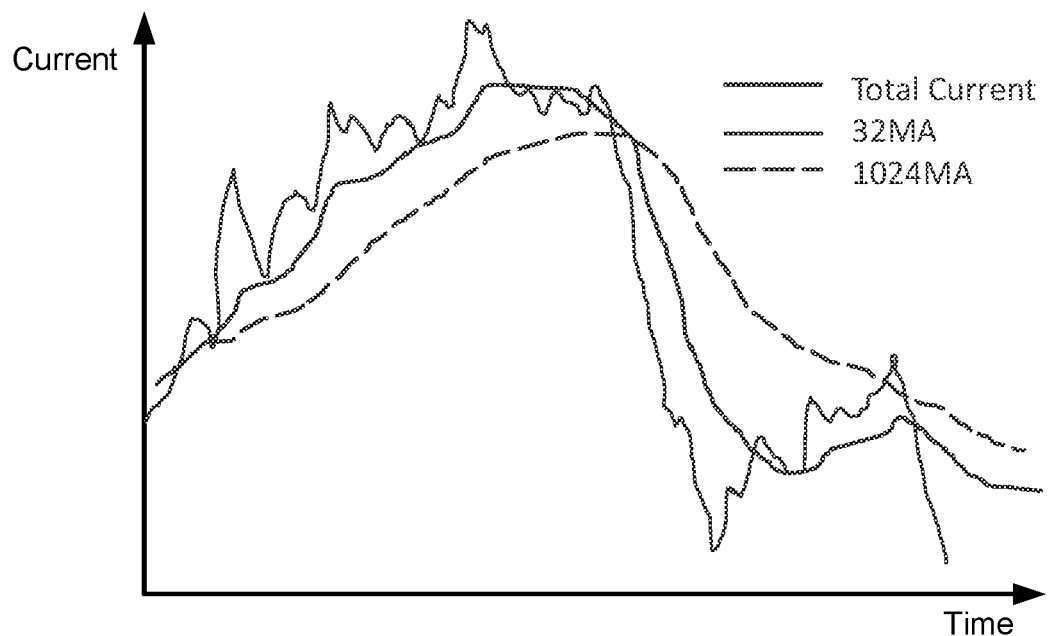
FIG. 5 is a diagram illustrating a relationship between total current and moving averages according to one embodiment.

FIG. 5 is a diagram illustrating the relationship of total current and moving averages (e.g., 32 MA and 1024 MA) according to one embodiment. The total current is shown in a solid line, 32 MA is shown in a short-dashed line, and 1024 MA is shown in a long-dashed line.

Figure 6:
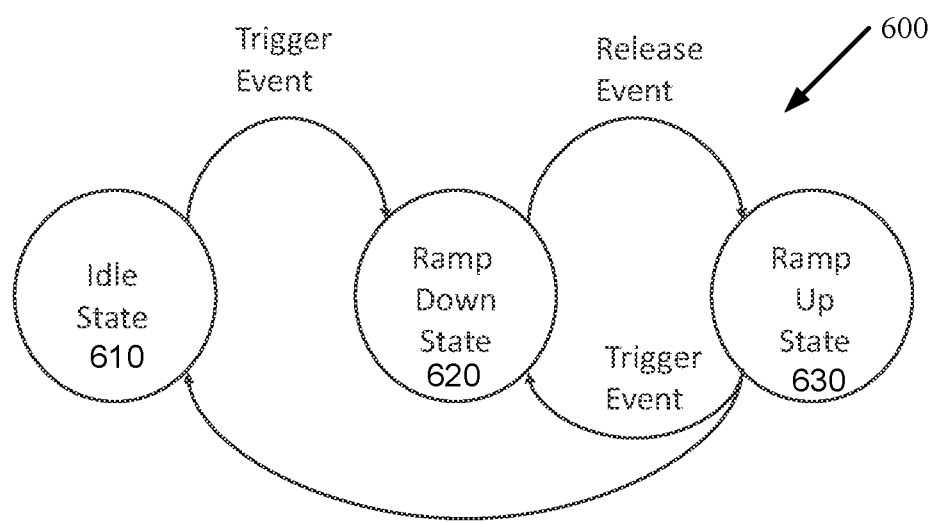
FIG. 6 is a diagram of a finite state machine (FSM) according to one embodiment.

FIG. 6 is a diagram of a finite state machine (FSM) 600 according to one embodiment. The FSM 600 is an example of the FSM 450 in FIG. 4. There are three states in the FSM 600: an idle state 610, a ramp-down state 620, and a ramp-up state 630. Idle state 610 indicates idleness; i.e., none of the processor cores in the system is being throttled. Ramp-down state 620 means ramping down the total current consumption of the processor cores from high to low current consumption. Ramp-up state 630 means ramping up the total current consumption of the processor cores from low to high current consumption.

The FSM 600 undergoes state transitions in response to trigger events and release events. More specifically, the trigger event in the FSM 600 can be either PCD_Trigger event or ICD_Trigger event; that is, a trigger event transition can be initiated when the condition for either the PCD_Trigger event or the ICD_Trigger event is met. A trigger event transition can also be initiated when the conditions for both the PCD_Trigger event and the ICD_Trigger event are met. A release event transition in the FSM 600 is initiated when the conditions for both the PCD_Release event and the ICD_Release event are met.

The FSM 600 makes a transition to the ramp-down state 620 when receiving a trigger event to ramp down the total current consumption of the processor cores. The FSM 600 makes a transition to the ramp-up state 630 when receiving a release event to ramp up the total current consumption of the processor cores.

Figure 7:
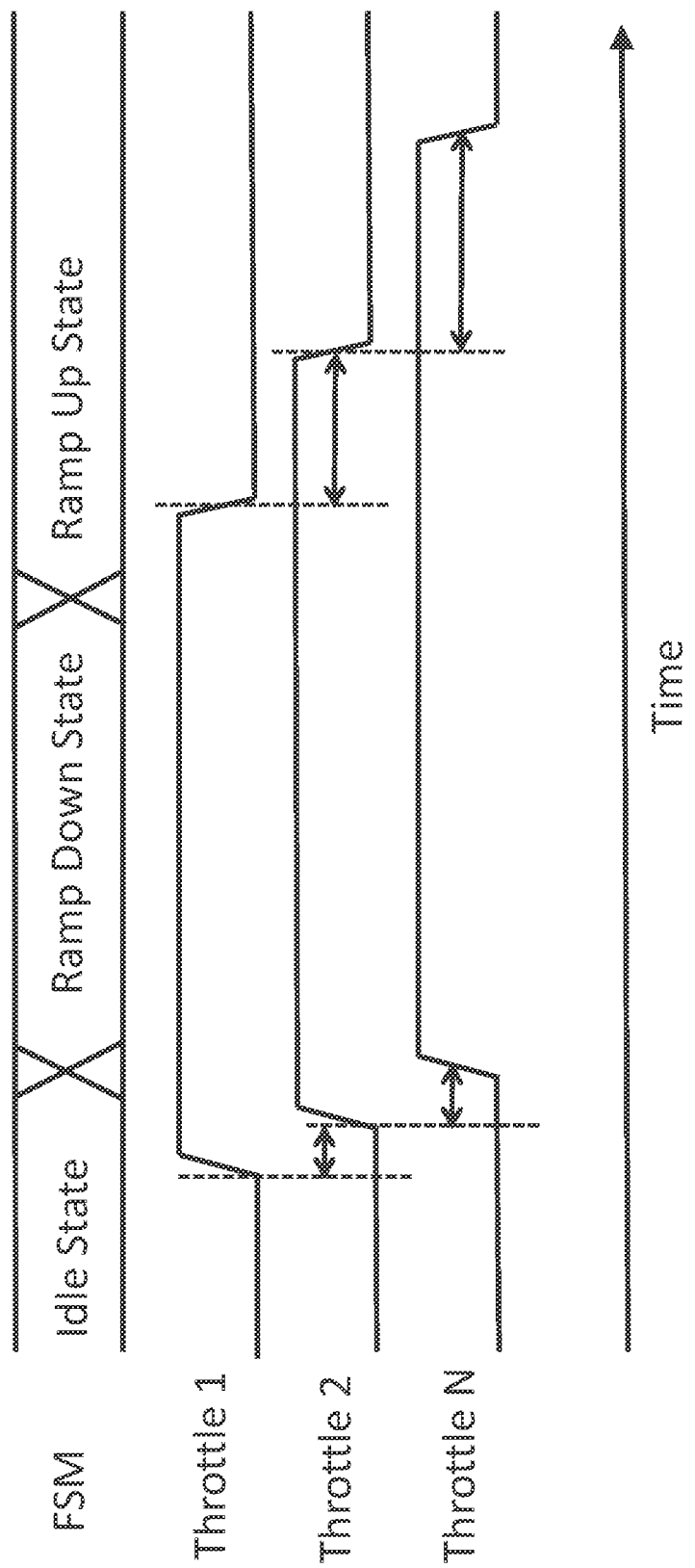
FIG. 7 is a diagram illustrating a timing waveform of throttle signals according to one embodiment.

FIG. 7 is a diagram illustrating the timing waveform of throttle signals generated by the throttle signal generator 460 (FIG. 4) according to one embodiment. Referring also to FIGS. 3, 4, and 6, the system (e.g., the system 300 in FIG. 3) is initially in the idle state 610. When a trigger event is detected (e.g., when a condition for either PCD_Trigger event or ICD_Trigger event is met), the management circuit 320 (FIG. 4) initiates a trigger event transition. That is, the throttle signal generator 460 asserts the throttle signals to transition the system to the ramp-down state 620. The throttle signal is asserted to each processor core one by one, and there is a time interval between the assertions of consecutive throttle signals to prevent the system from voltage overshooting. The time interval is a programmable number; e.g., t1 nanoseconds (ns) where t1>16.

When the system is in the ramp-down state 620 and a release event is detected (e.g., when conditions for both PCD_Release event and ICD_Release event are met), the management circuit 320 initiates a release event transition. That is, the throttle signal generator 460 de-asserts the throttle signals to transition the system to the ramp-up state 630. The throttle signal is de-asserted to each processor core one by one, and there is a time interval between the de-assertions of consecutive throttle signals to prevent the system from voltage undershooting. The time interval is a programmable number; e.g., t2 ns where t2>32.

When the system is in the ramp-up state 630 and a trigger event is detected, the throttle signal generator 460 asserts the throttle signals to transition the system to the ramp-down state 620. The throttle signal is asserted to each processor core one by one as mentioned before. Alternatively, the system may transition from the ramp-up state 630 to the idle state 610 when no trigger event is detected.

When the system is in transition from the ramp-down state 620 to the ramp-up state 630, the management circuit 320 may detect that a condition for a trigger event is met before all of the processor cores are released from throttle. Upon the detection, the management circuit 320 asserts the throttle signals to those processor cores that are released in order to ramp down the total current. For example, the system may be in transition from the ramp-down state 620 to the ramp-up state 630, and only cores 1 and 2 (out of 3 cores) are released from throttle when a trigger event is detected. The management circuit 320 can re-assert throttle signals 1 and 2 to re-throttle cores 1 and 2 and the system re-enters the ramp-down state 620. In this example, throttle signal 3 remains asserted and core 3 stays throttled.

Similarly, when the system is in transition from the ramp-up state 630 to the ramp-down state 620, the management circuit 320 may detect that a condition for a release event is met before all of the processor cores are throttled by the throttle signals. Upon the detection, the management circuit 320 de-asserts the throttle signals to those processor cores that are throttled in order to ramp up the total current.

Figure 8:
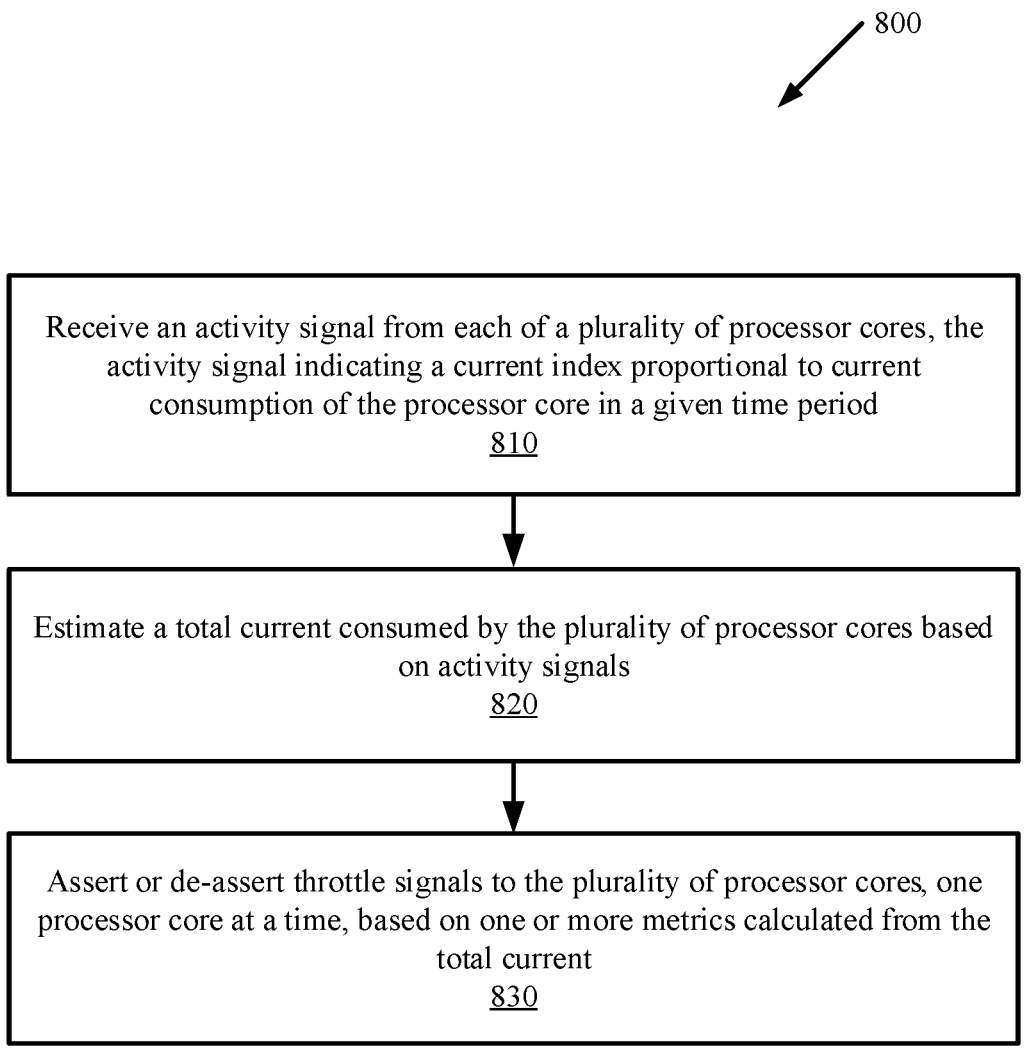
FIG. 8 is a flow diagram illustrating a method for current suppression according to one embodiment.

FIG. 8 is a flow diagram illustrating a method 800 for current suppression according to one embodiment. The method 800 may be performed by a circuit, such as the MCS management circuit 320 in FIGS. 3 and 4. In an alternative embodiment, the operations of the MCS management circuit 320 may be performed by software instructions stored in a memory and executed by general-purpose or special-purpose processing hardware. The circuit is coupled to multiple processor cores, such as the cores 310 in FIG. 3.

The circuit at step 810 receives an activity signal from each of the processor cores. The activity signal indicates a current index proportional to the current consumption of the processor core in a given time period. The circuit at step 820 estimates a total current consumed by the processor cores based on activity signals. The circuit at step 830 asserts or de-asserts throttle signals to the processor cores, one processor core at a time, based on one or more metrics calculated from the total current.

In one embodiment, the circuit further estimates a peak current and an inrush current consumed by the processor cores. The circuit may estimate the peak current by calculating a moving average of the total current, and assert or de-assert the throttle signals based on the peak current. The circuit may estimate the inrush current by calculating the difference between a short-term moving average and a long-term moving average of the total current, and assert or de-assert the throttle signals based on the inrush current. The circuit may estimate the total current by summing weighted current indices of all of the processor cores plus a leakage current, wherein each weighted current index is equal to the current index of each processor core multiplied by a current scaling factor and a DVFS factor.

In one embodiment, the circuit initiates a trigger event transition when the peak current or the inrush current exceeds a high threshold to thereby ramp down the total current consumed by the processor cores. When the trigger event transition is initiated, the circuit asserts the throttle signals to the processor cores, one processor core at a time with a programmable time interval between the assertions of consecutive throttle signals. The circuit initiates a release event transition when both the peak current and the inrush current are below a low threshold to thereby ramp up the total current consumed by the processor cores. When the release event transition is initiated, the circuit de-asserts the throttle signals to the processor cores, one processor core at a time with a programmable time interval between the de-assertions of consecutive throttle signals.

The operations of the flow diagram of FIG. 8 have been described with reference to the exemplary embodiments of FIGS. 3 and 4. However, it should be understood that the operations of the flow diagram of FIG. 8 can be performed by embodiments of the invention other than the embodiments of FIGS. 3 and 4, and the embodiments of FIGS. 3 and 4 can perform operations different than those discussed with reference to the flow diagram. While the flow diagram of FIG. 8 shows a particular order of operations performed by certain embodiments of the invention, it should be understood that such order is exemplary (e.g., alternative embodiments may perform the operations in a different order, combine certain operations, overlap certain operations, etc.).

Various functional components, blocks, or modules have been described herein. As will be appreciated by persons skilled in the art, the functional blocks or modules may be implemented through circuits (either dedicated circuits or general-purpose circuits, which operate under the control of one or more processors and coded instructions), which will typically comprise transistors that are configured in such a way as to control the operation of the circuity in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A management circuit coupled to a plurality of processor cores for performing current suppression, comprising:
   a detection circuit operative to:
     receive an activity signal from each processor core, the activity signal indicating a current index proportional to current consumption of the processor core in a given time period, wherein the current index corresponds to a sum of respective values assigned to respective opcodes executed or to be executed by the processor core in the given time period; and
     estimate a total current consumed by the plurality of processor cores based on activity signals of the processor cores; and
   a throttle signal generator operative to assert or de-assert throttle signals to the plurality of processor cores, one processor core at a time, based on one or more metrics calculated from the total current.

2. The management circuit of claim 1, wherein the detection circuit is further operative to estimate a peak current and an inrush current consumed by the plurality of processor cores, wherein the inrush current corresponds to a change in current per time unit.

3. The management circuit of claim 1, wherein the management circuit is further operative to:
   estimate a peak current of the processor cores by calculating a moving average of the total current; and
   assert or de-assert the throttle signals based on the peak current.

4. The management circuit of claim 1, wherein the management circuit is further operative to:
   estimate an inrush current of the processor cores by calculating a difference between a short-term moving average and a long-term moving average of the total current; and
   assert or de-assert throttle signals based on the inrush current.

5. The management circuit of claim 1, wherein the detection circuit is further operative to:
   estimate the total current by summing weighted current indices of all of the processor cores plus a leakage current, wherein each weighted current index is equal to the current index of each processor core multiplied by a current scaling factor and a dynamic voltage and frequency scaling (DVFS) factor.

6. The management circuit of claim 1, further comprising:
   a finite state machine (FSM), according to which the management circuit initiates a trigger event transition when a peak current or an inrush current exceeds a high threshold to thereby ramp down the total current consumed by the processor cores.

7. The management circuit of claim 6, wherein the throttle signal generator is further operative to:
   assert the throttle signals to the processor cores, one processor core at a time with a programmable time interval between assertions of consecutive throttle signals.

8. The management circuit of claim 1, further comprising:
   a finite state machine (FSM), according to which the management circuit initiates a release event transition when both a peak current and an inrush current are below a low threshold to thereby ramp up the total current consumed by the processor cores.

9. The management circuit of claim 8, wherein the throttle signal generator is further operative to:
   de-assert the throttle signals to the processor cores, one processor core at a time with a programmable time interval between de-assertions of consecutive throttle signals.

10. The management circuit of claim 1, wherein the management circuit is further operative to:
    detect that a condition for a release event is met before all of the processor cores are throttled by the throttle signals; and
    de-assert the throttle signals to the processor cores that are throttled to thereby ramp up the total current.

11. The management circuit of claim 1, wherein the management circuit is further operative to:
    detect that a condition for a trigger event is met before all of the processor cores are released from throttle; and assert the throttle signals to the processor cores that are released to thereby ramp down the total current.

12. A method for performing current suppression, comprising:
receiving an activity signal from each of a plurality of processor cores, the activity signal indicating a current index proportional to current consumption of the processor core in a given time period, wherein the current index is a sum of respective values assigned to respective opcodes executed or to be executed by the processor core in the given time period; and
estimating a total current consumed by the plurality of processor cores based on activity signals of the processor cores; and
asserting or de-asserting throttle signals to the plurality of processor cores, one processor core at a time, based on one or more metrics calculated from the total current.

13. The method of claim 12, wherein estimating the total current further comprises:
estimating a peak current and an inrush current consumed by the plurality of processor cores, wherein the inrush current corresponds to a change in current per time unit.

14. The method of claim 12, further comprising:
estimating a peak current of the processor cores by calculating a moving average of the total current; and
asserting or de-asserting the throttle signals based on the peak current.

15. The method of claim 12, further comprising:
estimating an inrush current of the processor cores by calculating a difference between a short-term moving average and a long-term moving average of the total current; and
asserting or de-asserting throttle signals based on the inrush current.

16. The method of claim 12, wherein estimating the total current further comprises:
estimating the total current by summing weighted current indices of all of the processor cores plus a leakage current, wherein each weighted current index is equal to the current index of each processor core multiplied by a current scaling factor and a dynamic voltage and frequency scaling (DVFS) factor.

17. The method of claim 12, further comprising:
initiating a trigger event transition when a peak current or an inrush current exceeds a high threshold to thereby ramp down the total current consumed by the processor cores; and
initiating a release event transition when both the peak current and the inrush current are below a low threshold to thereby ramp up the total current consumed by the processor cores.

18. The method of claim 17, wherein asserting or de-asserting throttle signals further comprises:
asserting the throttle signals to the processor cores, one processor core at a time with a programmable time interval between assertions of consecutive throttle signals.

19. The method of claim 17, wherein asserting or de-asserting throttle signals further comprises:
de-asserting the throttle signals to the processor cores, one processor core at a time with a programmable time interval between de-assertions of consecutive throttle signals.

20. A management circuit coupled to a plurality of processor cores for performing current suppression, comprising:
a detection circuit operative to:
receive an activity signal from each processor core, the activity signal indicating a current index proportional to current consumption of the processor core in a given time period;
estimate a total current consumed by the plurality of processor cores based on activity signals of the processor cores;
estimate an inrush current of the processor cores by calculating a difference between a short-term moving average and a long-term moving average of the total current; and
a throttle signal generator operative to assert or de-assert throttle signals to the plurality of processor cores, one processor core at a time, based on the inrush current and one or more metrics calculated from the total current.

* * * * *